United States Patent [19]

Woodman et al.

[11] Patent Number: 5,059,751
[45] Date of Patent: Oct. 22, 1991

[54] COMBINATION ARMING/DISCRIMINATING INERTIA SWITCH

[75] Inventors: Douglas A. Woodman; Michael R. Sewell, both of Chatham, Canada

[73] Assignee: Siemens Automotive Limited, Chatham, Canada

[21] Appl. No.: 573,613

[22] Filed: Aug. 27, 1990

[51] Int. Cl.⁵ .................. H01H 35/14; B60R 21/32
[52] U.S. Cl. .................. 200/61.45 M; 200/61.48; 280/735; 307/121
[58] Field of Search ............ 200/61.45 R, 61.45 M, 200/61.48–61.51, 61.53, 61.44; 307/121; 280/735

[56] References Cited

U.S. PATENT DOCUMENTS

| | | | |
|---|---|---|---|
| 3,489,917 | 1/1970 | Gurol | 307/121 |
| 3,639,710 | 2/1972 | Haruna et al. | 200/61.48 |
| 3,762,494 | 10/1973 | Peters | 200/61.45 R X |
| 3,778,572 | 12/1973 | Matsui et al. | 200/61.48 X |
| 3,780,314 | 12/1973 | Inose et al. | 307/121 |
| 3,840,088 | 10/1974 | Marumo et al. | 200/61.45 M X |
| 3,848,695 | 11/1974 | Lacaze, Jr. | 200/503 X |
| 3,859,482 | 1/1975 | Matsui | 200/61.08 |
| 3,889,130 | 6/1975 | Breed | 307/121 |
| 4,097,699 | 6/1978 | Larson | 200/61.45 R |

Primary Examiner—J. R. Scott
Attorney, Agent, or Firm—George L. Boller; Russel C. Wells

[57] ABSTRACT

The switch assembly comprises a single inertial sensing mass which is magnetically biased to an initial position along a path of travel within an enclosure. In this position, the mass holds a normally closed arming switch open. A normally open discriminating switch is disposed in the path of travel of the mass to be closed by the mass upon the occurrence of a velocity change indicating that a passive occupant restraint device such as an air bag should be deployed. Travel of the mass from the initial position releases the arming switch before the discriminating switch closes.

6 Claims, 1 Drawing Sheet

COMBINATION ARMING/DISCRIMINATING INERTIA SWITCH

FIELD OF THE INVENTION

This invention relates to inertia switches that are used in passive automotive vehicle occupant restraint systems for the electrically-fired deployment of occupant restraint devices upon concurrence of conditions which call for deployment of the restraint device.

BACKGROUND AND SUMMARY OF THE INVENTION

In certain types of passive automotive vehicle occupant restraint systems, the electric firing circuit for causing deployment of a passive occupant restraint device (such as an air bag) comprises an arming switch portion and a discriminating switch portion, the latter portion containing plural discriminating switches. Both arming and discriminating switches are inertia switches which are actuated in response to certain velocity changes. A principal purpose in employing both an arming switch portion and a discriminating switch portion in the firing circuit is to distinguish the concurrence of conditions that do not call for deployment of the restraint device from the concurrence of conditions that do. For example, a mechanic who, during the process of repairing or adjusting an automobile, hammers at the front of the vehicle with sufficient force might cause a discriminating switch in the vicinity to be sufficiently impacted that it activates. In the absence of an arming switch in the circuit, the restraint device would be unintentionally deployed. An arming sensor, therefore, is intended to prevent such an unintentional deployment.

The assignee of this patent application currently produces a switch assembly consisting of two switch elements mounted in a single metal housing. This product is sometimes called a "dual sensor", and it provides both an arming switch function and a discriminating switch function. The product is fairly large and more expensive to produce than single sensors used individually as individual arming switches and as individual discriminating switches.

The present invention relates to a new and unique construction for a combination arming/discriminating switch assembly in which a single inertia sensing mass is associated with both an arming switch portion and a discriminating switch portion. The present invention offers a number of significant advantages such as: reduction in the number of component parts; reduction in the number of moving parts; reliability improvement; smaller packaging size; and reduction in labor and material costs.

The incorporation of multiple switches into an inertia switch assembly is not per se novel as evidenced by U.S. Pat. Nos. 3,889,130 and 4,097,699, which were developed in connection with a limited search conducted on the present invention. It is believed that the particular configuration of arming and discriminating switches in an inertia switch assembly as hereinafter described and claimed, has not heretofore been contemplated. The ensuing Description Of The Preferred Embodiment discloses principles of the invention with reference to the accompanying drawings illustrating an exemplary embodiment of the invention according to the best mode contemplated at the present time for carrying out the invention.

DESCRIPTION OF THE PREFERRED EMBODIMENT

Figure 1:
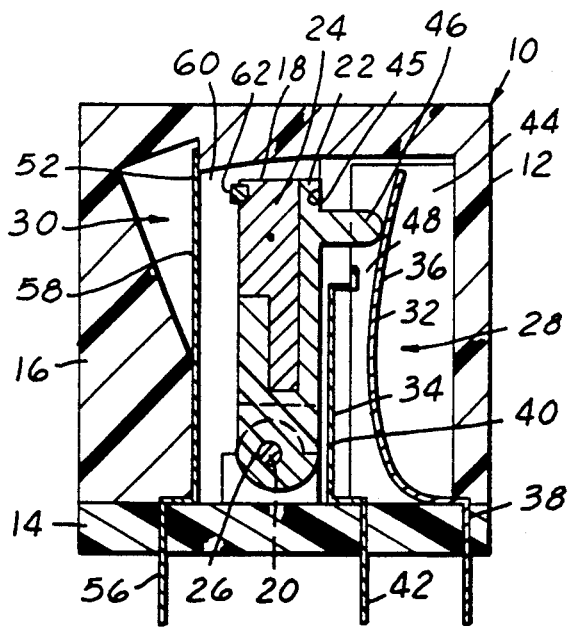
FIG. 1 is a side elevational view in cross-section of an exemplary embodiment of arming/discriminating inertia switch assembly according to principles of the invention and illustrates the assembly in an initial condition.

FIG. 1 shows a switch assembly 10 comprising a plastic enclosure 12 formed by a base 14 and a hollow cover 16. A rotor 18 is mounted on base 14 for pivotal motion about an axis 20. Rotor 18 comprises an inertial sensing mass formed by a non-magnetic portion 22 and a ferro-magnetic portion 24. The pivotal mounting of rotor 18 on base 14 is provided by an axle 26 that is coaxial with axis 20.

Assembly 10 further comprises an arming switch 28 and a discriminating switch 30 that are disposed on opposite sides of rotor 18 within enclosure 12.

Arming switch 28 comprises a first contact 32 and a second contact 34. Contact 32 comprises a resiliently flexible curved blade portion 36 and a stationarily mounted terminal portion 38. This latter portion 38 is staked onto and passes through base 14 so as to support the former portion 36 in cantilever fashion on the base and to connect same to an associated electric circuit such as the one to be described in connection with FIG. 1A. Contact 34 comprises a blade portion 40 and a terminal portion 42. This latter portion 42 is staked onto and passes through base 14 so as to support the former portion 40 on the base and to connect same to the associated circuit.

Also disposed within enclosure 12 is a permanent magnet 44 arranged to exert a magnetic restraining force on rotor 18 by virtue of its interaction with the ferro-magnetic portion 24 of the rotor. The magnetic restraint force biases rotor 18 in the clockwise sense as viewed in FIG. 1 to a condition where a portion of the rotor abuts a stop surface 45 of the enclosure. This then is the condition portrayed by FIG. 1, and it represents the initial condition of the inertial switch assembly.

The non-magnetic portion 22 of rotor 18 possess a projection 46 that acts on contact 32 such that with the rotor in the initial condition, the blade portion 36 of contact 32 is resiliently flexed in cantilever fashion in a general clockwise sense as viewed in FIG. 1 about the contact's staking on base 14. In this condition of flexing, blade portion 36 is spaced from the distal end of blade portion 40 of contact 34 by means of an air gap 48. At this same time contact 34 is in a free, unstressed condition. In the absence of projection 46, contact 32 would relax to engage contact 34, and hence, arming switch 28 is a normally closed switch that is held open by rotor 18 when the rotor is in the initial condition of FIG. 1. It should be appreciated that the force which is being exerted by contact 32 on rotor 18 in the condition illustrated in FIG. 1 is insufficient to dislodge the rotor from the initial condition against stop surface 45 to which it is biased by magnet 44.

When switch assembly 10 is subjected to a velocity change that is sufficient to overcome the magnetic attractive force exerted by magnet 44 on the rotor, the rotor begins to travel in the counter-clockwise sense as viewed in FIG. i. The resiliency of its blade portion 36 enables contact 32 to follow the rotor's motion as the contact is enabled to increasingly relax. Attainment of a sufficient amount of rotor motion from the initial condition results in the complete elimination of air gap 48 by engagement of contact 32 with contact 34, and the concurrent transmission of a switch closure signal to the firing circuit via terminal portions 38 and 42, thereby arming the firing circuit. It is this condition which is portrayed in FIG. 2.

Discriminating switch 30 comprises a pair of contacts 52 and 54 respectively which are laterally spaced apart from each other in assembly 10. In the drawing FIGS. 1, 2, and 3, the laterally spaced apart direction for the contacts 52 and 54 is into and out of the plane of the paper containing the figures. Accordingly, in FIGS. 1, 2, and 3 only contact 52 appears since contact 54 is in the portion which has been sectioned away from assembly 10 in order to present the cross-sectional views of FIGS. 1, 2 and 3. The contact 54 is identified in FIGS. 1A, 2A and 3A and constructionally it is identical to contact 52 which will now be described.

Contact 52 comprises a terminal portion 56 which is staked to base 14 to provide for connection with a corresponding connection point of the electric firing circuit. It also comprises a blade portion 58 that is supported in cantilever fashion within the interior of enclosure 12. The blade portions 58 of the respective contacts 52 and 54 are disposed in the path of travel of rotor 18 as the rotor pivots about axis 20 in the counter-clockwise sense as viewed in FIG. 1.

With rotor 18 assuming its initial condition as shown in FIG. 1, there exists an air gap 60 between contacts 52 and 54 and a bridging element 62 that is mounted on the rotor in juxtaposition to the two contacts. Motion of the rotor from its initial condition begins closing gap 60. When the rotor has moved to the position of FIG. 2, the arming switch has been closed, but the air gap 60 still exists although much diminished in size from that shown in FIG. 1.

Figure 2A:
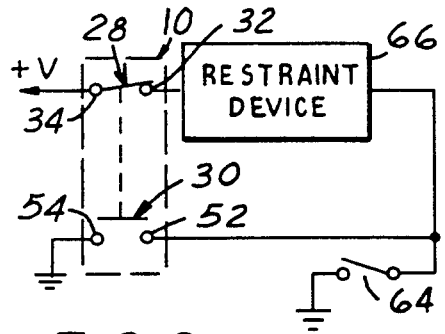
FIG. 2A is a view like FIG. 1A showing the corresponding circuit condition.
Figure 2:
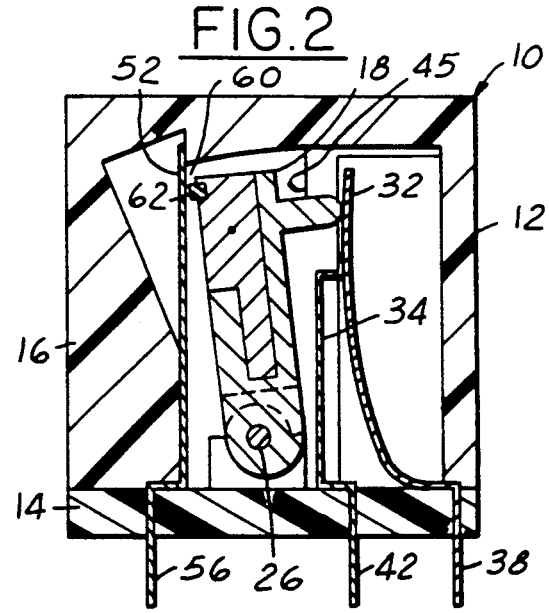
FIG. 2 is a view like FIG. 1 showing a further condition of operation.
Figure 3:
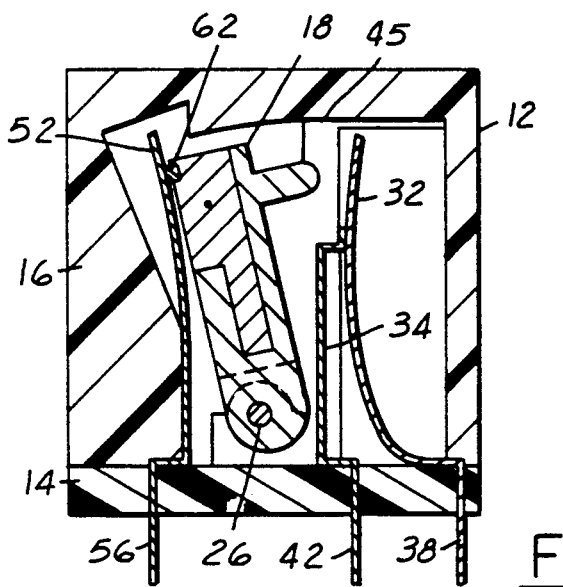
FIG. 3 is a view like FIGS. 1 and 2 but illustrating a still further condition of operation.

Continued counter-clockwise motion of the rotor from the FIG. 2 position results in complete elimination of air gap 60 with the result that bridging element 62 bridges contacts 52 and 54 to close the circuit between them. The discriminating switch therefore provides a closure signal via the terminal portions 56 of the two contacts 52 and 54. Additional counter-clockwise motion of rotor 18 after discriminating switch closure has occurred serves to increasingly flex the blade portions 58 of the two contacts 52 and 54 in a general counter-clockwise sense.

The construction of switch assembly 10 has therefore been shown to provide a switching action wherein closure of the discriminating switch will occur only after closure of the arming switch. Any particular switch assembly 10 is designed in accordance with known design techniques and engineering principles to provide the proper response characteristics for the particular system with which the switch assembly is used. A typical requirement for a discriminating switch is that the switch provide a signal that is indicative of the incipiency of a velocity change that calls for deployment of the occupant restraint. This is obtained by imparting damping to the motion of the inertial sensing mass, and such damping can be performed by conventional procedures such as viscous pneumatic damping and electromagnetic damping by way of example. In the illustrated embodiment, rotor 18 and enclosure 12 are constructed in an appropriate manner to provide viscous pneumatic damping. In this way, switch assembly 12 will "integrate" a velocity change, and if the result of the integration is sufficiently large, then the discriminating switch attains closure. An insufficient result of integration will fail to close the discriminating switch with the consequence that the rotor is returned to the initial position by the force of magnet 44 acting upon it, and in such case assembly 10 alone will not fire the restraint deployment firing circuit.

Figure 1A:
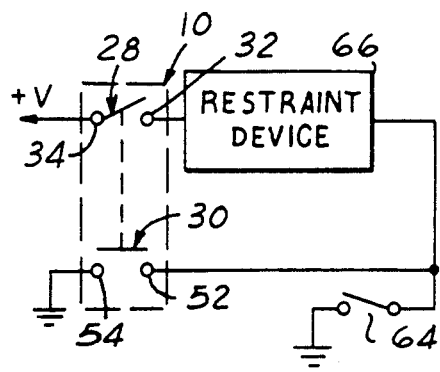
FIG. 1A is an electrical schematic diagram of an electric-firing circuit portion of a passive automotive vehicle occupant restraint system and illustrates the connection of the assembly of FIG. 1 in circuit with other components of the system and for the same condition of the inertia switch assembly as portrayed in FIG. 1.
Figure 3A:
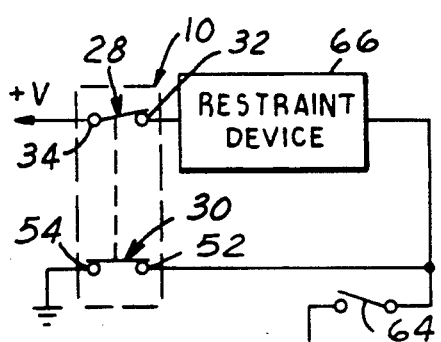
FIG. 3A is a view like FIGS. 1A and 2A showing the corresponding circuit condition.

It can be seen, however, in FIGS. 1A, 2A, and 3A that an additional discriminating switch 64 is connected in the firing circuit for the restraint device 66. The restraint device will therefore be deployed upon concurrence of: arming of the circuit by closure of arming switch 28 AND closure of discriminating switch 30 OR discriminating switch 64. It is possible that such an additional discriminating switch 64 could experience a sufficient inertial force to cause its own closure which, in the absence of arming switch 28, would deploy the restraint. Hence the arming switch serves to guard against certain unintended deployments of the restraint.

What is claimed is:

1. A passive automotive vehicle occupant restraint system comprising an electrically-fired occupant restraint device which is deployed in response to the concurrence of the closure of an arming switch means and of the closure of a discriminating switch means in an electrical firing circuit for the restraint device, characterized in that said arming switch means comprises an arming switch which has normally closed contacts that are caused to be held open by the attraction of a magnetically responsive inertial sensing mass to a magnet means with respect to which said inertial sensing mass is relatively movable until velocity change sensed by said inertial sensing mass creates inertial force in a direction opposite that of the magnetic attraction of said inertial sensing mass to said magnet means to move said inertial sensing mass along a defined path of motion to a point beyond which said inertial sensing mass ceases to hold said contacts of said arming switch open, there is provided means to impose damping on motion of said inertial sensing mass along said path in said direction, and said discriminating switch means comprises a discriminating switch which has normally open contacts that remain open until closed by said inertial sensing mass having executed an amount of motion along said path in said direction sufficient to have caused said inertial sensing mass to cease holding said contacts of said arming switch open so that as a consequence concurrence of the closure of said contacts of said arming switch and of the closure of said contacts of said discriminating switch is attained upon said inertial sensing mass having executed said amount of motion along said path in said direction.

2. A passive automotive vehicle occupant restraint system comprising an electrically-fired occupant restraint device which is deployed in response to the concurrence of the closure of an arming switch means and of the closure of a discriminating switch means in an electrical firing circuit for the restraint device, characterized in that said discriminating switch means comprises a discriminating switch which has normally open contacts that remain open until caused to be closed by a magnetically responsive inertial sensing mass having executed, in response to certain velocity change, an amount of motion along a defined path in a direction opposite that of the attraction of said inertial sensing mass to a magnet with respect to which said inertial sensing mass is relatively movable, said arming switch means comprises an arming switch which has normally closed contacts that are caused to be held open by said inertial sensing mass until velocity change sensed by said inertial sensing mass creates inertial force in said direction to move said inertial sensing mass along said path to a point beyond which said inertial sensing mass ceases to hold said contacts of said arming switch open, there is provided means to impose damping on motion of said inertial sensing mass along said path in said direction, and the closure of said contacts of said discriminating switch caused by said inertial sensing mass having executed said amount of motion occurs after closure of said contacts of said arming switch so that as a consequence concurrence of the closure of said contacts of said arming switch and of the closure of said contacts of said discriminating switch is attained upon said inertial sensing mass having executed said amount of motion along said path in said direction.

3. An arming/discriminating inertia switch assembly comprising a switch enclosure, a magnetically responsive inertial sensing mass disposed for motion within said enclosure along a defined path of motion, means providing a magnetic restraining force urging said inertial sensing mass to an initial position along said path of motion, means for damping motion of said inertial sensing mass along said path in a direction away from said initial position, said inertial sensing mass occupying said initial position until said enclosure is subjected to velocity change causing said inertial sensing mass to move along said path of motion away from said initial position against said magnetic restraining force, said magnetic restraining force being sufficient to return said inertial sensing mass to said initial position upon sufficient timely attenuation of said velocity change, an arming switch that is disposed within said enclosure and that has normally closed contacts which are caused to be held open by said inertial sensing mass so long as said inertial sensing mass occupies said initial position and any position along said path within an initial segment of said path immediately contiguous said initial position and which cease to be held open by said inertial sensing mass whenever said inertial sensing mass occupies a position along said path that is beyond said initial segment, a discriminating switch that is disposed within said enclosure and that has normally open contacts which are caused to be closed by said inertial sensing mass whenever said inertial sensing mass occupies a position within a succeeding segment of said path that is beyond said initial segment of said path, and terminal means mounted on said enclosure providing for connection of said contacts of said arming and discriminating switches in an electric-firing circuit for deploying a passive automotive vehicle occupant restraint device upon concurrence of closure of said contacts of said arming switch and of closure of said contacts of said discriminating switch.

4. A system as set forth in claim 1 characterized further in that the motion of said inertial sensing mass along said path occurs along an arc of a circle.

5. A system as set forth in claim 2 characterized further in that the motion of said inertial sensing mass along said path occurs along an arc of a circle.

6. A switch assembly as set forth in claim 3 characterized further in that the motion of said inertial sensing mass along said path occurs along an arc of a circle.

* * * * *